June 1, 1954     J. J. KOWALIK     2,679,764
SLACK ADJUSTER
Filed May 19, 1950     2 Sheets-Sheet 1
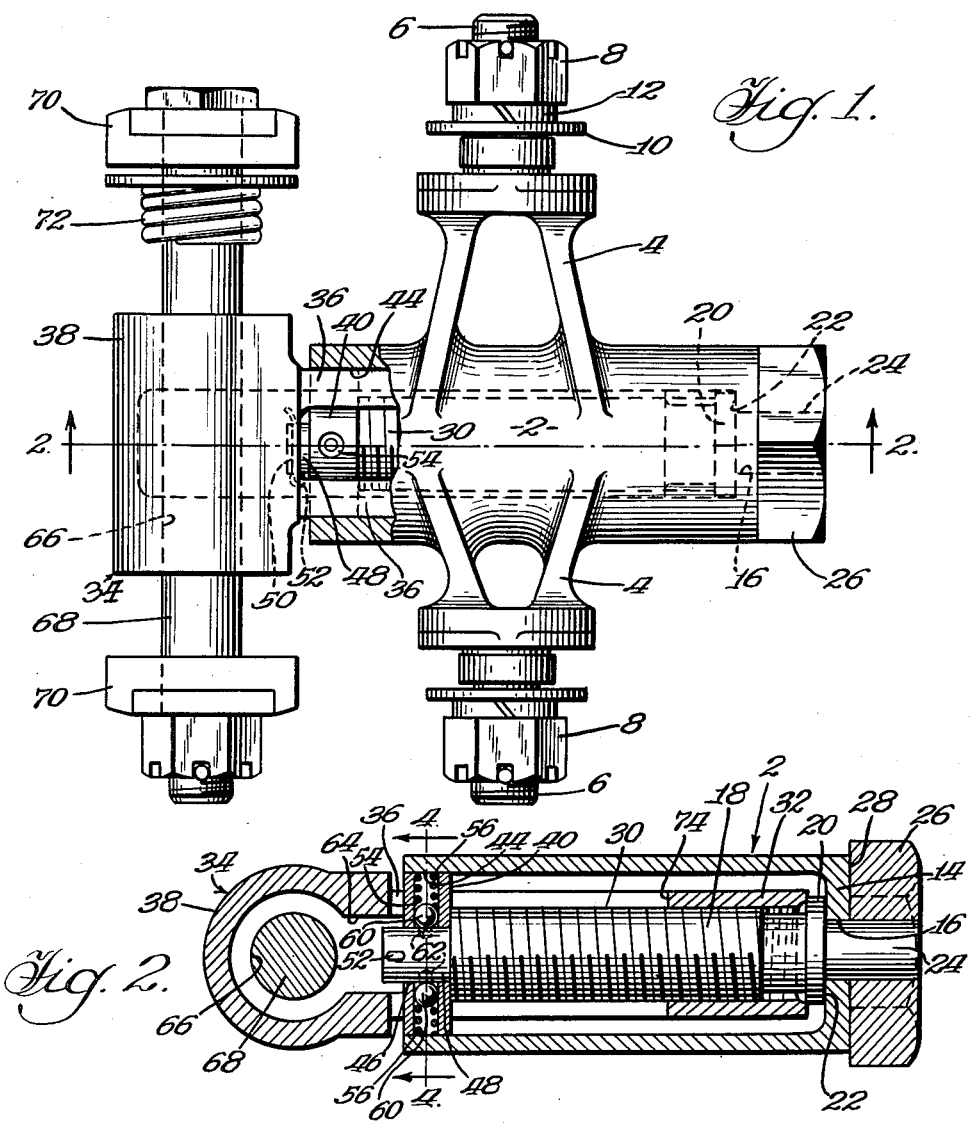
INVENTOR.
John J. Kowalik

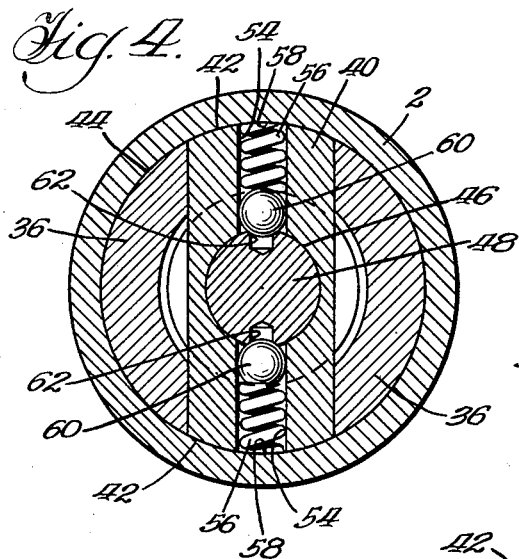
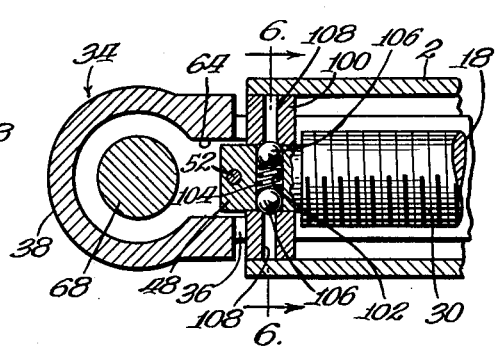
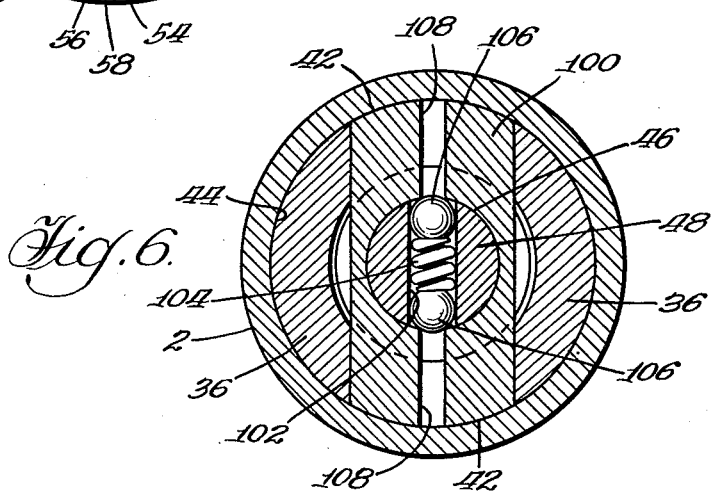
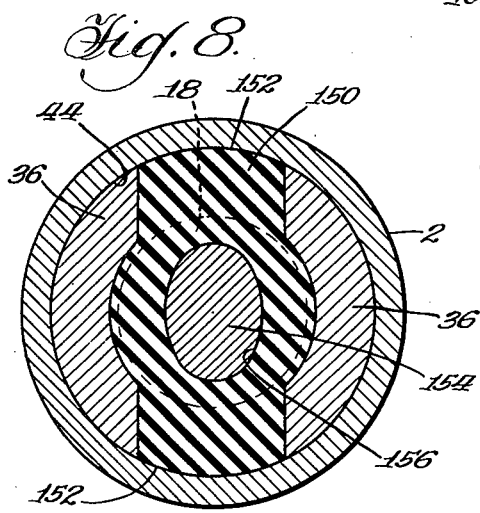
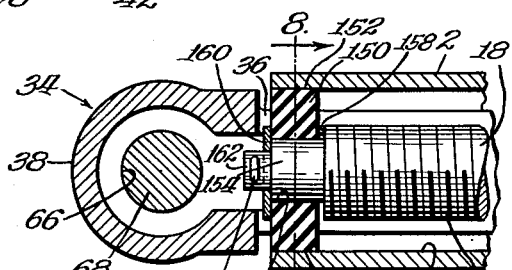

Patented June 1, 1954

2,679,764

UNITED STATES PATENT OFFICE 2,679,764

SLACK ADJUSTER

John J. Kowalik, Chicago, Ill., assignor to American Steel Foundries, Chicago, Ill., a corporation of New Jersey Application May 19, 1950, Serial No. 163,069

15 Claims. (Cl. 74—424.8)

This invention relates to slack adjusters and more particularly to a novel railway slack adjuster adapted to compensate for wear in brake rigging commonly associated with passenger car trucks.

Such brake rigging is subjected to continuous severe pounding and vibrations in service, and various arrangements had been tried to provide a satisfactory slack adjuster, which will withstand the abuse and perform efficiently for a long time.

A general object of the invention is to provide a simple, compact and economical slack adjuster of the screw type which will meet these service requirements.

A more specific object of the invention is to provide in a slack adjuster an arrangement which supports opposite ends of the adjusting screw for the full operating range of the slack adjuster thus preventing one end of the adjusting screw from hanging out unsupported into space and shaking and thereby destroying the parts, especially the threads. The present invention further contemplates the provision of a slack adjuster construction in which the adjustment screw is enclosed within a housing which also serves to support the screw adjacent its ends.

A still further object of the invention is to provide a support for the inner end of the adjusting screw, the support embodying resilient means to yieldingly resist vibrations of the screw.

A different object of the invention is to improve the locking arrangement for holding the screw in adjusted position by providing for the inner end of the screw and the support therefor to have releasable interlocking engagement with each other to prevent undesired rotation of the screw.

Another object of the invention is to interlock the support for the inner end of the screw with the nut, the support having sliding engagement with the nut longitudinally of the slack adjuster and having rotatable engagement with the screw, the rotation of the screw being resisted by cooperating means on the screw and the support, the means being in the form of a spring-pressed ball arrangement carried by the support and engaging in detents in the screw or vice versa, or the support being formed of resilient material with a non-round opening molded therein and receiving a complementary shaped portion on the inner end of the screw, whereby, when the screw attempts to rotate, it must overcome the compressive resistance of the material.

The last form of the invention contemplates the provision of a resilient block of material, the block having tight engagement with the arms of the nut and with the enclosing housing to prevent the entry of dirt on the threads of the screw.

A further object of the invention is to provide a slack adjuster of reduced weight and comprising an outer housing to which one end of the adjusting screw is rotatably connected, the screw extending into the housing and having threaded engagement with a cylindrical portion at one end of a nut which slidably operates within the housing, the nut having spaced arms intermediate its ends between which is received a bearing block snugly fitted within the housing and supporting the other end of the screw and connected to the screw, the block serving also as a positive stop to limit unthreading of the nut with respect to the screw and thus preventing complete withdrawal of the nut from the housing.

These and other objects of the invention will become more apparent from the specification and the drawings, wherein:

Figure 1 is a top plan view of a conventional railway slack adjuster embodying one form of the invention, a portion of the housing being broken away to more clearly illustrate the construction;

Figure 2 is a sectional view taken substantially on the line 2—2 of Figure 1;

Figure 3 is an end view, taken from the right as seen in Figure 1;

Figure 4 is a transverse sectional view taken substantially on the line 4—4 of Figure 2;

Figures 5 and 6 illustrate a modification of the invention, Figure 5 being a view comparable to Figure 2, and Figure 6 being a view taken substantially on the line 6—6 of Figure 5;

Figures 7 and 8 illustrate a further modification of the invention, Figure 7 being a view comparable to Figures 2 and 5, and Figure 8 being a sectional view taken substantially on the line 8—8 of Figure 7.

Describing the invention in detail and referring first to the embodiment shown in Figures 1 to 4, the slack adjuster comprises a cast iron or steel housing, generally designated 2, the housing being provided at opposite sides thereof with arms 4, 4 intermediate its ends, the arms having threaded extremities 6, 6 on which are threaded nuts 8, 8, the extremities being provided with washers 10 and lock washers 12. The nuts 8, 8 are adapted to connect the arms 4, 4 to straps (not shown) of conventional brake rigging, such as shown for example in W. H. Baselt, Patent 2,191,-138 for Clasp Brake, issued February 20, 1940.

The housing 2 is provided with an inturned annular flange 14, which closes that end of the tubular housing 2 except for a round opening 16, which is formed centrally in the end flange 14.

A screw 18 is positioned within the housing 2 and is formed with a collar or stop 20 at one end in abutment as at 22 with the inner side of the flange 14. The screw 18 is provided with an unthreaded shank 24 of reduced cross-section, the shank extending outwardly from the stop 20 complementally through the opening 16 and outwardly of the outer side of the flange 14. A non-round hexagonal head 26 is connected to the shank 24 in any convenient manner preferably as by press-fitting thereon, the head 26 engaging as at 28 the outer side of the flange 14. It will be thus readily noted that the screw is supported at its outer end by the housing.

The screw 18 has a threaded portion 30 intermediate its ends inwardly of the collar 20, the threaded portion 30 having threaded engagement with an annular threaded portion 32 at the inner end of a nut, generally indicated 34, the nut being slidable within the housing.

The nut comprises a bifurcated portion intermediate its ends, defined by a pair of spaced arms 36, 36, said arms extending between the annular portion 32 at the inner end of the nut and a transverse head 38 at the outer end of the nut and formed integral therewith. It will be noted that the legs 36, 36 are interconnected at one end by the portion 32 and at the other end by the head 38.

The legs 36, 36 of the nut receive a bearing block or a support 40 therebetween, the block 40 extending lengthwise preferably vertically and having arcuate surfaces as at 42, 42 at its top and bottom ends fitting complementally against an interior cylindrical surface 44 of the housing 2. The block 40 has a round opening 46 centrally thereof through which extends a complementary reduced portion 48 at the inner end of the screw. It will be noted that the block 40 thus supports the inner end of the screw. The block being shugly fitted into the housing may be considered a part thereof whereby opposite ends of the screw are supported by the same member, namely by the housing 2, whereby the vibrations of the screw are not aggravated by relative movement between different parts of the slack adjuster mechanism. Outwardly of the block 40, the portion 48 of the adjusting screw is provided with a transverse opening 50 through which extends a cotter key 52, the key 52 securing the block on the screw.

The block 40 is provided with longitudinal openings 54, 54, which are located at diametrical opposite sides of the opening 46. Within each opening 54 is positioned a spring 56 which at one or outer end seats as at 58 against the surface 44 of the housing and at the other or inner end seats against a ball 60 which is urged into a detent 62 in the portion 48 of the adjusting screw 18. It will be readily observed that the support for the inner end of the screw, which is formed by the block, thus incorporates resilient means for supporting the screw, the resilient means being in the form of the spring ball arrangements 56, 60. It will be noted that the locking arrangements 58, 60 work in opposition to each other transversely of the axis of the screw and are preferably vertically positioned.

The head 38 at the outer end of the nut is formed with a cavity, as at 64, in alignment with the portion 48 at the inner end of the adjusting screw, to accommodate the portion 48 within the head 38 when the slack adjuster is in its fully contracted or closed condition, as shown in Figures 1 and 2.

The head 38 is provided with an opening 66 extending transversely of the screw, said opening receiving a bolt and nut assembly 68 having spaced washers 70, 70 and carrying a spring 72, the spring and washers forming conventional connecting means for an associated brake lever (not shown), as may readily be seen in the above-mentioned patent.

It will be appreciated that the nut and housing are held against rotation with respect to each other by means of straps (not shown) and that rotation of the screw, which may be effected by engaging the head 26 with a wrench, will cause either an expansion or contraction of the slack adjuster, depending on whether the screw is rotated right-hand or left-hand. The screw is yieldingly held in adjusted position at each half turn by the balls 60 being urged into the detents or recesses 62. Expansion of the slack adjuster is limited by engagement of the outer edge 74 of the sleeve portion 32 of the nut with the inner side of the bearing block 40, the bearing block being prevented from moving off the inner end of the screw by means of the cotter key 52.

To disassemble the slack adjuster, the slack adjuster is placed in approximately fully expanded condition with the outer edge 74 of the portion 32 of the nut close to the inner side of the block 40. The screw is rotated to position the cotter key substantially parallel to the arms 36, 36. The cotter key is removed by extracting with a suitable tool such as pliers. The screw is then rotated in a direction unthreading the nut off the screw, whereupon the sleeve 32 engages the block and urges the block out of the housing and off the portion 48, whereupon the block assembly may be removed from between the arms inasmuch as the block is provided with parallel surfaces at opposite sides extending transversely of the screw and in slidable engagement with complementary surfaces on adjacent sides of the arms 36, 36.

It will be noted that the arms are curved concentric with the axis of the slack adjuster to strengthen the construction and to accommodate a screw of maximum diameter. The arms complementally engage at their outer sides with the inner surface 44 of the housing. The screw may be removed from the housing by pressing the head 26 off the screw.

To reassemble, the screw is inserted into the housing with the collar 20 against the inner side of flange 14 and the shank 24 extended through the complementary opening 16. The head is press fitted onto the shank 24. The threaded end 32 of the nut is inserted into the inner end of the housing and threaded onto the inner end of the screw until it is about half way into the housing. The block 40 is assembled with the springs 56 and the balls 60 and a short rod (not shown) may be fitted into the opening 46 which will maintain the spring and ball arrangements in position. A clamp may be arranged to engage the outer ends of the springs and the assembly may be inserted between the arms 36, 36. The assembly may then be moved axially of the screw, whereby the end portion 48 of the screw causes the temporary plug or rod (not shown) to be pushed out of the opening 46. Simultaneously the block moves into the housing, so that it slips out of the clamp and the springs 56 slide off the clamp and engage against the inner side 44 of the housing 2. The block is moved to the position shown in Figure 2. The cotter key 52 is then inserted into the opening 50 and the ends of the cotter key are separated to prevent its removal, thus completing the assembly of the slack adjuster.

An alternate method of assembly would be to assemble the screw with the nut and the bearing block before connecting the screw to the housing.

Referring now to the embodiment shown in

Figures 5 and 6, wherein parts similar to those shown in the previous embodiment are identified by corresponding reference numerals, the housing 2 receives a bearing block 100 between the arms 36, 36 of the nut 34. The reduced end portion 48 of the screw, which extends through the complementary opening 46 in the center of the block 100, is provided with a transverse opening 102 within which is fitted a spring 104 which acts transversely of the screw, the spring engaging balls 106, 106 at opposite ends thereof, said balls being fitted for the major portions thereof within the opening 102 and extending partially into adjacent ends of diametrically aligned detents or drilled holes 108, 108 within the block 100, the holes extending longitudinally of the block. It will be noted that the screw is locked at each half turn in adjusted position by the balls 106 entering into the respective detents 108. The reason for drilling the detents 108 entirely through the block is to provide an inexpensive method of manufacture since one drilling operation will provide two detents. Of course, the opening 46 could be notched at its top and bottom to provide a similar effect.

This embodiment would preferably be assembled by threading the screw into the nut and positioning the spring ball arrangements 104, 106 within the opening 102 and then mounting the support or bearing block 100 on the end 48 of the screw between the arms 36, 36 and fastening the block 100 with the cotter key 52. The screw and nut and block may then be assembled with the housing.

Referring now to the embodiment shown in Figures 7 and 8, wherein parts corresponding to those shown in previous embodiments, are identified by corresponding reference numerals, the bearing or support block 150 is made of resilient material of any well known type, such as is not affected by lubricating oils or grease. The block 150 has a complementary fit into the space between the arms 36, 36 and has complementary engagement at its top and bottom ends as at 152, 152 with the internal surface 44 of the housing 2. The block 150 is preferably under slight compression to form a tight fit with the engaged surfaces to prevent the entry of dirt on the threads of the slack adjuster screw.

The inner end 154 of the adjusting screw is formed non-round in cross section, preferably oval-shaped, and extends through a complementary opening 156, which is molded in the center of the block 150. It will be noted that movement of the block longitudinaly with respect to the screw is limited inwardly of the housing through engagement of the block with a shoulder 158, which terminates the threads of the screw at the inner end thereof. Of course, a washer could be interposed between the shoulder 158 and the block 150, if desired. Movement of the block outwardly of the housing is limited by abutment of the outer side of the block with a washer 160 which is mounted on a reduced round or cylindrical portion 162 of the screw, the washer being held in position by a cotter key 164.

In this embodiment adjustment is effected as in the previous embodiments by rotating the screw. The screw is held yieldably locked in adjusted position at each half turn. It will be understood that the resilient material operates in grease so that the arms 36, 36 may slide easily with respect to the block and the rotation of the screw is preferably resisted solely by compressive resistance of the resilient block. Although, if desired, frictional resistance between the block 150 and the portion 154 may be had. The surface of the portion 154 and the surface of the opening 156 have smooth sliding action due to the grease between the surfaces. It will be noted that the resilient material during rotation of the screw from the position shown in Figure 8 will flow around the portion 154 so that its distortion longitudinally of the screw will not be excessive. This embodiment may be readily assembled with the screw and the nut in or out of the housing 2.

I claim:

1. A slack adjuster comprising a body having an open end and a closed end with a wall having a central cylindrical opening, a screw within the body and including an inner shank and an outer shank, the outer shank extending through said cylindrical opening, means on the outer shank portion of the screw at opposite sides of said wall interlocking said screw with said wall against axial movement with respect to the body, said wall supporting said screw at said one end, a nut extending into said body and having a cylindrical portion at its inner end in slidable engagement with the interior of the body and surrounding the screw and in threaded engagement therewith, spaced substantially parallel arms extending from said cylindrical portion of the nut and in slidable engagement at their outer sides with the interior of the housing, a bearing member fitted into the open end of the housing between said arms outwardly of said cylindrical portion of the nut and having an axial opening therethrough receiving the inner shank portion of said screw, said screw being rotatable with respect to said bearing member, means on the screw interlocking said bearing member therewith against axial movement, said bearing member acting as a stop through abutment with said cylindrical portion of the nut to limit outward movement of the nut with respect to the housing.

2. A slack adjuster comprising a body having an open end and a closed end with a wall having a cylindrical opening, a screw rotatably interlocked with the wall and having a portion supported by the wall and extending through the opening and carrying wrench engaging means outwardly of the body for rotating the screw, a bearing block fitted into the open end of the body and having an axial opening rotatably receiving the adjacent end of the screw and interlocked therewith against axial movement, a nut having spaced arms extending at opposite sides of the block into the body and in slidable engagement therewith, a portion interconnecting said arms between said block and wall and in threaded engagement with the screw and adapted for abutment with the block to limit outward movement of the nut with respect to the body, said block having apertures therethrough open to the screw, said screw having recesses for registry with said apertures, a ball in each aperture extending into a recess in the screw, and a spring in each aperture compressed between the interior of said body and the adjacent ball for urging the latter against the screw into the related recess for releasably holding the screw in adjusted position.

3. A slack adjuster comprising a body having an open end and closed at the other end by a wall with a central cylindrical opening, a screw within the body having an end portion extending through the opening, means on the end portion of the screw interlocked with the wall for preventing relative axial movement between the screw and the body, said means including wrench engaging means outwardly of the body for rotating the screw, bearing means fitted into the open end of the body over the other end of the screw whereby said screw is supported at opposite ends from said body, said bearing means and screw being formed and arranged to permit rotation of the screw, a nut having portions extending at opposite sides of the bearing means into the housing and having a portion in threaded engagement with the screw and disposed between the bearing means and said wall, said portion being adapted for abutment with said bearing means to limit outward movement of the nut with respect to the housing.

4. In a slack adjuster, a housing having means for connection to one brake part, a nut telescoping into the housing and having means for connection to another brake part, means for adjusting the relative positions of said housing and nut comprising a screw rotatably connected at one end to one end of the housing and threaded into the nut, a bearing slidable with respect to the nut and interlocked therewith against relative rotation, said bearing supporting said screw and being supported from said housing at the other end thereof and interlocked against axial movement with respect to said screw, and means for yieldingly holding the screw in adjusted position comprising a transverse aperture in the screw and recesses in the block, balls at opposite ends of the aperture entering registering recesses in the block, and spring means in the aperture compressed between said balls.

5. A slack adjuster comprising a body having an inturned flange at one end with an opening therethrough, a screw within the body having a collar at one end in abutment with the internal side of said flange, a shank integral with the screw extending outwardly of the collar through said opening, wrench engaging means fixed to said shank and in abutment with the external side of the flange, a nut entering into the housing from the other end thereof and having a threaded end in threaded engagement with the screw, and support means for the other end of the screw including resilient means reacting between the screw and the body transversely of the screw and body.

6. A slack adjuster, according to claim 5, wherein said support means comprise a block of resilient material embracing said screw along non-round surfaces.

7. In a slack adjuster, a housing member, a screw member rotatably supported therein at one point, a nut in threaded engagement with the screw member, and support means for supporting said screw member from said housing member at another point spaced from said one point axially of the screw member, said means and screw member having interengaging means releasably interlocking said screw member in adjusted position.

8. A slack adjuster, according to claim 7, wherein said support means embody a resilient construction for yieldably controlling movements of the screw member.

9. A slack adjuster, according to claim 7, wherein said support means comprises a metallic block with a transverse round opening therein receiving a round portion of the screw member, the block snugly fitting into the housing member, and wherein said interengaging means comprises detents in the periphery of said opening, a transverse aperture through said portion, and balls at opposite ends of the aperture projecting outwardly of the periphery of said portion and adapted to enter into said detents, and resilient means within said aperture reacting between said balls for yieldingly urging them outwardly from said aperture.

10. In a slack adjuster, a housing, a screw therewithin and rotatably connected thereto and supported thereby at one point and a block of resilient material supporting said screw from said housing at another point, said screw and block engaging each other along non-round surfaces.

11. In a slack adjuster, according to claim 10, wherein said block comprises a central oval opening receiving a complementary portion of the screw, and wherein said block is longest along the major axis of the opening and widest along the minor axis of the opening.

12. In a slack adjuster, according to claim 10, wherein said block comprises a central oval shape opening receiving a complementary portion of the screw, and wherein said block is substantially longer and wider than the length of the major axis of said opening.

13. In a releasable interlocking arrangement for an adjusting screw, a portion of non-round cross-section on the screw, and a block of resilient material having an opening molded therein, complementary to said portion and receiving said portion therein with at most negligible stress of the material in one position of the screw only, said screw being rotatable from the one position only by substantially distorting said material to stress the same whereby rotation of the screw is resisted.

14. A slack adjuster comprising a housing, a screw member within the housing, a pair of spaced bearing means provided on the housing rotatably supporting opposite ends of the screw member and engaging the latter against axial movement relative to the housing, and a nut slidable and non rotatable within the housing and in threaded engagement with the screw member, one of said means comprising a bearing block formed of resilient material.

15. A slack adjuster comprising a housing, a screw member within the housing, a pin of spaced bearing means provided on the housing rotatably supporting opposite ends of the screw member and engaging the latter against axial movement relative to the housing, and a nut slidable and non rotatable within the housing and in threaded engagement with the screw, one of said means comprising a bearing block formed of resilient material and means for resisting rotation of the screw with respect to the block comprising a non-round opening molded in said block and receiving a complementary portion of said screw therethrough, said block being adapted to be distorted to permit rotation of the screw when desired.

References Cited in the file of this patent

UNITED STATES PATENTS

| Number | Name | Date |
|---|---|---|
| 1,418,298 | Gorman | June 6, 1922 |
| 2,217,533 | Wolarsky | Oct. 8, 1940 |
| 2,243,732 | Eubanks | May 27, 1941 |
| 2,403,512 | Flesch | July 9, 1946 |
| 2,419,673 | Busignies et al. | Apr. 29, 1947 |
| 2,538,757 | Bratthauer et al. | Jan. 23, 1951 |
| 2,555,124 | Gothberg | May 29, 1951 |